(12) United States Patent
Hetrich et al.

(10) Patent No.: US 11,813,951 B2
(45) Date of Patent: Nov. 14, 2023

(54) DC PIN LOCALIZATION FOR AC CONNECTION OF ELECTRIC VEHICLES

(71) Applicant: ABB Schweiz AG, Baden (CH)

(72) Inventors: Matthew Hetrich, Raleigh, NC (US); Gregory A. Cole, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 245 days.

(21) Appl. No.: 17/331,243

(22) Filed: May 26, 2021

(65) Prior Publication Data
US 2022/0379758 A1 Dec. 1, 2022

(51) Int. Cl.
| | |
|---|---|
| B60L 53/37 | (2019.01) |
| B60L 53/60 | (2019.01) |
| H02J 7/00 | (2006.01) |
| H01R 13/631 | (2006.01) |
| H01R 13/66 | (2006.01) |
| G05B 13/02 | (2006.01) |
| G06T 7/73 | (2017.01) |
| B25J 9/16 | (2006.01) |
| B60L 53/16 | (2019.01) |
| G06V 20/59 | (2022.01) |

(52) U.S. Cl.
CPC .............. *B60L 53/37* (2019.02); *B25J 9/163* (2013.01); *B25J 9/1697* (2013.01); *B60L 53/16* (2019.02); *B60L 53/60* (2019.02); *G05B 13/027* (2013.01); *G06T 7/73* (2017.01); *G06V 20/59* (2022.01); *H01R 13/631* (2013.01); *H01R 13/6691* (2013.01); *H02J 7/0045* (2013.01); *G06T 2207/20081* (2013.01); *G06T 2207/20084* (2013.01); *G06T 2207/30268* (2013.01); *H01R 2201/26* (2013.01)

(58) Field of Classification Search
CPC ....................................................... B60L 53/37
USPC ....................................................... 320/109
See application file for complete search history.

(56) References Cited

U.S. PATENT DOCUMENTS

| | | | |
|---|---|---|---|
| 2013/0076902 A1* | 3/2013 | Gao ........................ | B60L 53/31 348/148 |
| 2015/0137755 A1* | 5/2015 | Sadano ................... | B60L 53/16 320/109 |
| 2017/0008412 A1* | 1/2017 | Wu .......................... | B60L 53/65 |
| 2019/0135133 A1* | 5/2019 | Miller ..................... | B60L 53/34 |
| 2019/0217715 A1* | 7/2019 | Christen ................. | B60L 53/31 |

(Continued)

*Primary Examiner* — Jerry D Robbins
(74) *Attorney, Agent, or Firm* — Leydig, Voit & Mayer, Ltd.

(57) ABSTRACT

An automated charging system for an electric vehicle is disclosed that includes a plug with a built-in camera assembly. The camera assembly captures images of a charging port of the electric vehicle, which are processed by one or more processors to estimate the location of the charging port relative to the plug. A control system generates signals for one or more actuators to move the plug relative to the charging port, thereby inserting the plug into the charging port to connect a power supply to the electric vehicle. The images may be processed via an image recognition algorithm and/or one or more machine learning algorithms. In an embodiment, the images are processed by a neural network to estimate the location of the charging port relative to the plug. The plug can also include a tapered structure to make fine adjustments to the position or orientation of the plug during connection.

20 Claims, 7 Drawing Sheets

(56) References Cited

U.S. PATENT DOCUMENTS

| | | | |
|---|---|---|---|
| 2019/0340782 A1* | 11/2019 | Sinha | G06T 7/13 |
| 2019/0341661 A1* | 11/2019 | Guerra | B60L 53/16 |
| 2020/0031248 A1* | 1/2020 | Kwak | G05D 1/0231 |
| 2020/0189413 A1* | 6/2020 | Fagan | B60L 53/18 |
| 2020/0361331 A1* | 11/2020 | Shin | B60L 53/305 |
| 2021/0001736 A1* | 1/2021 | Schoob | B60L 3/0038 |
| 2021/0086641 A1* | 3/2021 | Fuhlbrigge | B60L 53/35 |
| 2022/0055491 A1* | 2/2022 | Labell | H01R 13/629 |
| 2022/0355692 A1* | 11/2022 | Hetrich | G06N 3/08 |

* cited by examiner

DC PIN LOCALIZATION FOR AC CONNECTION OF ELECTRIC VEHICLES

TECHNICAL FIELD

The application relates to electric vehicle technology. More specifically, the application is directed to a technique for aligning a charging plug with a charging port of an electric vehicle.

BACKGROUND

Electric vehicles such as the Tesla Model S as well as plug-in hybrid vehicles and others are gaining ground in today's marketplace compared to traditional internal combustion engine (ICE) vehicles. As more drivers adopt this new technology, the infrastructure that is needed to support these systems is being created. Gas stations are being supplemented with charging stations, parking lots have added dedicated parking spots for electric vehicles with access to charging cables, and high-speed, DC charging locations, which may be referred to as supercharger, are popping up along major highways to allow electric vehicle drivers to take longer range trips.

In addition to commercial infrastructure being developed to entice more people to purchase electric vehicles, devices and systems to support the electric vehicle at a person's residence are also being developed. In the beginning, most early adopters of electric vehicles were required to charge the vehicle using a simple extension cord that would charge the vehicle at a slow rate of speed. Subsequently, faster chargers using high voltage (e.g., 240 or 480 VAC) were adopted to increase the speed at which the vehicle was charged. However, these systems typically required some electrical work to be performed at the user's home as these high voltage supplies are not as common as the lower voltage 120 VAC supply in the US marketplace.

Many of these solutions still required a user to manually connect a cable between a charging port of the vehicle and the charging system. The user would access the charging port and insert a plug into the charging port in order to connect the vehicle's charging system to the available power at the user's home. However, this takes time and a user may forget to do this procedure, only remembering the next day once the user discovers that the vehicle is not fully charged when they get in the vehicle. If the user is late, then there is no time to charge the vehicle, which can lead to dissatisfaction with electric vehicles generally compared to the fast re-fueling of ICE counterparts. Further, users directly handling the components of the charging system can expose users to risk of electrocution, which is especially dangerous with systems that use higher voltage to charge the electric vehicle in less time.

One solution that is being developed is to use automated charging systems that connect the vehicle's charging subsystem to a power supply automatically when the driver parks the vehicle in a designated spot. However, different vehicle manufacturers may locate the charging ports in different areas of the vehicle. Even different models from the same manufacturer may locate the charging ports in different locations. Some manufacturers may use proprietary charging ports on their vehicles, that require adapters to be used with standard plugs. Further, the driver may not park the vehicle in the exact same spot every time, meaning the location of the charging port of a single vehicle can vary day to day relative to a fixed location of the automated charging system in a particular parking spot. To address these issues, the automated charging system needs to be designed to robustly adapt to different conditions. However, cost of the system for the consumer is also a consideration and, as such, the system needs to be as simple as possible while also providing accurate, hands-free operations. Solutions to these issues are needed to help consumers adopt electric vehicle technology at low costs.

SUMMARY

An automated charging system is described in the following detailed description. The automated charging system includes a plug that is actuated by robotic control to insert the plug into a charging port of the vehicle. The plug includes a camera and a tapered structure.

In accordance with one aspect of the present disclosure, an automated charging system for an electric vehicle is described herein. The automated charging system includes: a plug configured to be mated with a charging port of the electric vehicle; a camera assembly mounted on the plug; one or more actuators configured to adjust a position of the plug relative to the charging port; and a control system including one or more processors that are configured to control the one or more actuators based on an image of the charging port captured by the camera assembly.

In some embodiments, the control system processes the image using an object recognition algorithm to identify at least one structure of the charging port that is unobstructed during insertion of the plug. In an embodiment, the at least one structure of the charging port includes at least one direct current (DC) pin of the charging port. The plug is configured to be connected to at least two alternating current (AC) pins of the charging port when inserted into the charging port.

In some embodiments, the plug comprises a tapered structure attached to or integrated with the plug that contacts at least one surface of the charging port during insertion of the plug to force the plug to move relative to the charging port. In an embodiment, the at least one surface of the charging port includes a cylindrical surface surrounding a DC pin of the charging port. In yet another embodiment, the tapered structure is capable of being retracted into a body of the plug. A force is applied to the tapered structure by a spring to extend the tapered structure from the body.

In some embodiments, the plug is mounted on a distal end of a rigid chain comprising a plurality of links. The rigid chain can be extended from a chassis of the automated charging system. In an embodiment, the one or more actuators include at least one actuator configured to rotate the plug around an axis defined according to the distal end of the rigid chain.

In some embodiments, the charging port comprises a combined charging system (CCS) connector that includes pins for AC charging as well as pins for DC charging. In an embodiment, the plug includes corresponding sockets for AC charging that are designed to mate with the pins for AC charging, and the plug does not include corresponding sockets for DC charging.

In some embodiments, the control system includes: a memory configured to store the image; a processor configured to control the one or more actuators; and a machine learning (ML) accelerator configured to apply the image to a neural network to generate an estimate of a location of the charging port relative to the plug. In an embodiment, the control system further comprises a real-time controller configured to generate signals for each of the one or more actuators.

In an embodiment, the plug includes a wireless chip and a transceiver configured to transmit the image to the control system via a wireless local area network.

In accordance with a second aspect of the present disclosure, a method for charging an electric vehicle is described herein. The method includes: capturing, by a camera mounted on a plug, a first image of a charging port of the electric vehicle; processing the image to identify a location of the charging port relative to the plug; controlling one or more actuators to position the plug proximate the charging port based on the image; and supplying power to the electric vehicle via the plug.

In some embodiments, the method further comprises: periodically capturing, by the camera, one or more additional images of the charging port; and processing the one or more additional images to update the location of the charging port relative to the plug. The position of the plug corresponding to the first image is different from a position of the plug corresponding to at least one image of the one or more additional images.

In some embodiments, the image is processed by a neural network to estimate the location of the charging port. In an embodiment, the neural network is a convolutional neural network (CNN).

In accordance with a third aspect of the present disclosure, an automated charging system is described herein. The automated charging system includes: a power supply, a plug, and a control system. The power supply is configured to generate an alternating current (AC) power for charging an electric vehicle. The plug is connected to the power supply via a cable. The plug includes a camera assembly configured to capture an image. The control system is configured to process the image to estimate a location of a charging port of an electric vehicle. The control system generates signals for one or more actuators that cause the automated charging system to position the plug relative to the charging port responsive to the location.

In some embodiments, the control system includes: a memory and at least one processor. The at least one processor is configured to read the image from the memory and process the image via a neural network to estimate the location. In an embodiment, the at least one processor includes a central processing unit and a machine learning (ML) accelerator. The ML accelerator implements the neural network to process the image.

DETAILED DESCRIPTION

The present disclosure is directed to an automated charging system for an electric vehicle. The automated charging system is configured to automatically insert a plug into a charging port of a vehicle when the vehicle is located in a charging bay, which may otherwise be referred to as a parking spot that includes the automated charging system. In an embodiment, the electric vehicle can signal the automated charging system to connect the plug to the charging port to begin charging the vehicle. The signal can be sent wirelessly via infrared signal or other wireless communication means such as via a wireless local area network.

The plug, which may be referred to as an end effector or the like, can include a camera located below the pins of the plug that provide alternating current (AC) power to the vehicle's charging system when the plug is inserted into the charging port. The camera captures images of the vehicle and/or charging port in order to provide feedback to the automated charging system that can be used to control the position and orientation of the plug. The plug can be actuated by robotic actuators to move relative to the charging port.

In some embodiments, the vehicle's charging port may include both AC and DC (direct current) connections for use with different charging systems. The automated charging system uses AC power to charge the vehicle and, as such, the DC pins of the vehicle's charging port may remain unused when the plug is connected to the charging port. As such, the camera on the plug can have an unobstructed view of the DC pins while the plug is inserted into the charging port, providing a closed-loop feedback to the control system of the automated charging system to indicate when the plug has been accurately inserted into the charging port. As the plug gets closer to the vehicle's charging port, the view of the DC pins in the charging port will get larger and the images captured by the camera can be analyzed to estimate a depth to which the plug has been inserted into the charging port.

In some embodiments, the plug can also incorporate one or more structures that can facilitate insertion of the plug into the charging port. In an embodiment, the plug includes at least one tapered structure that is designed to mate with the DC pin just before and/or during insertion. The force on the surface of the tapered structure can help to finely adjust a position of the plug relative to the charging port as the connection is completed. This fine-tuning by mechanical means allows for a much less accurate robotic control system to perform the insertion than would otherwise be required if 100% of the positioning were performed by robotic actuation of the plug in response to the camera feedback and/or other types of sensors such as encoders.

Figure 1:
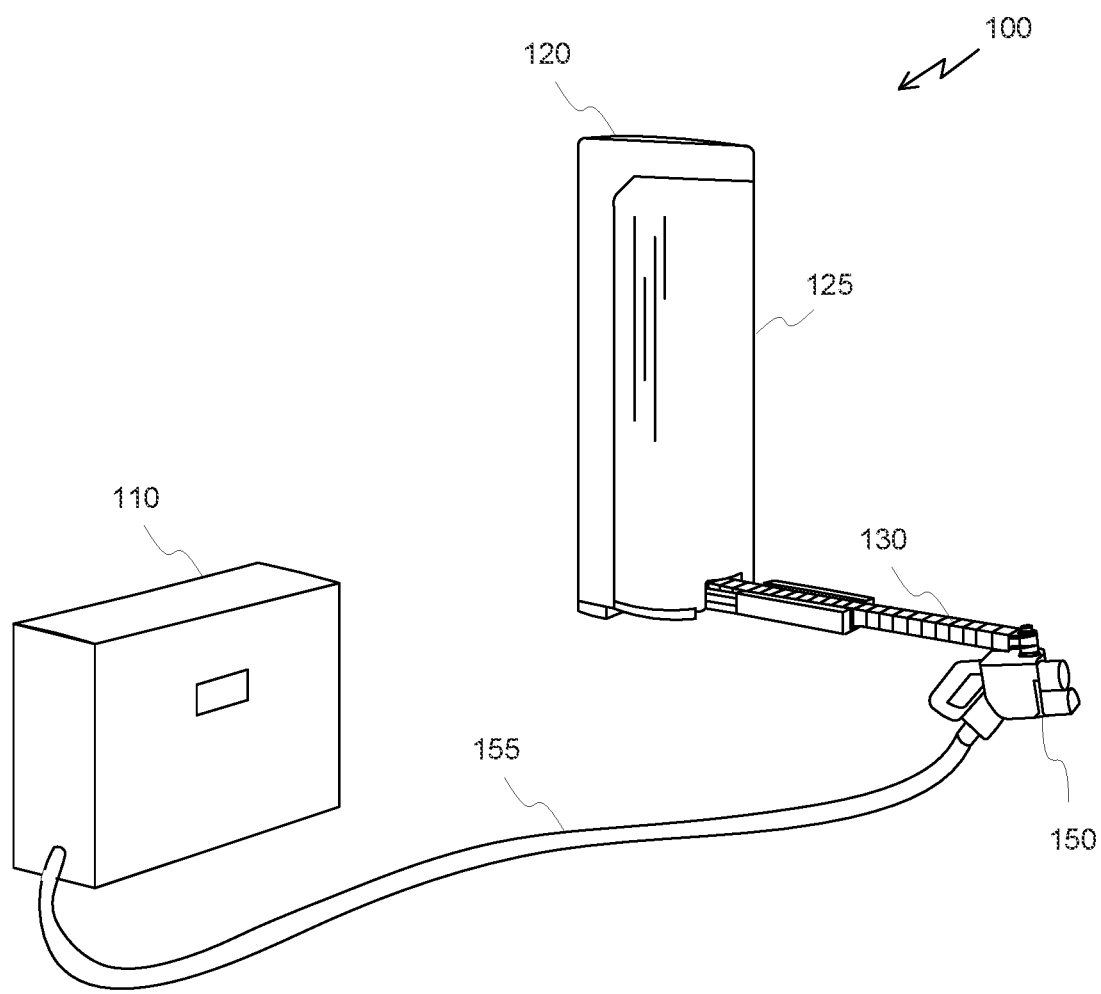
FIG. 1 illustrates an automated charging system for an electric vehicle, in accordance with some embodiments.

FIG. 1 illustrates an automated charging system 100 for an electric vehicle, in accordance with some embodiments. The automated charging system includes a power supply 110 and a chassis 120 that contains one or more actuators (not explicitly shown). The power supply 110 is typically connected to an electrical grid to supply AC power to the electric vehicle. In some embodiments, the power supply 110 can include additional electrical components and/or circuits such as line filters, transformers, circuit protection equipment (e.g., fuses and/or circuit breakers), batteries (to store excess power in cases the electrical grid fails), or the like. The power supply is connected to a plug 150 that has a form factor that is configured to mate with a charging port of an electric vehicle. A cable 155 provides electricity from the power supply 110 to the plug 150.

The plug 150 can be moved in three-dimensions relative to the vehicle. In an embodiment, the plug 150 is mounted to a rigid chain 130 comprising a number of links. A characteristic of the rigid chain 130 is that, in a straight configuration, the links provide a substantially rigid platform that can be extended in a radial direction from the chassis 120. In other words, the links are designed such that the surfaces of the links interfere and prevent a load at the end of the rigid chain 130 from deflecting towards the ground, to an extent. However, upon retraction, the links can rotate relative to adjacent links that allow the rigid chain 130 to be stowed inside the chassis 120 in an efficient manner that reduces a space requirement of the automated charging system 100. It will be appreciated that the rigid chain 130 is not absolutely rigid and that tolerances in the links allow for some degree of deflection at the end of the rigid chain 130.

In some embodiments, the chassis 120 houses a number of actuators that can be configured to move the plug 150. For example, a first actuator can be configured to extend or retract the rigid chain 130 from the chassis 120 in order to move the plug in a radial direction. A second actuator can be configured to rotate the rigid chain around a vertical axis proximate the center of a cylindrical cover 125 that protects the actuators and other components inside the chassis 120. A third actuator can move the rigid chain along a direction of the vertical axis. The three actuators, therefore, correspond to cylindrical coordinates <ρ, φ, z>, where p corresponds to a radial coordinate, y corresponds to an angular coordinate, and x corresponds to a height coordinate.

In addition to the three actuators configured to move the position of the plug 150 in three-dimensions, one or more additional actuators can be configured to orient the plug 150 at the end of the rigid chain 130. In an embodiment, a fourth actuator rotates the plug 150 in a plane parallel to the floor of the charging bay. In some embodiments, the automated charging system 100 may include a fifth actuator that rotates the plug 150 around a radial axis that extends along the direction of extension of the rigid chain 130 and/or a sixth actuator that rotates the plug around an axis orthogonal to the radial axis and parallel with the floor of the charging bay. In such cases, the plug 150 may have 5 or 6 degrees of freedom.

Each of the actuators may include sensors, such as optical encoders, limit switches, or the like, that provide feedback to a controller that indicates the position of the plug 150 relative to the chassis 120. The controller may include electronics for sensing a location of the charging port of the electric vehicle and transmitting signals to each of the actuators to move the position of the plug 150.

It will be appreciated that the automated charging system 100 described in FIG. 1 is only one example embodiment of a robotic system configured to insert the plug 150 into a corresponding charging port of an electric vehicle. In other embodiments, the design of the robotics system, including number and type of actuators, degrees of freedom, control system, and the like can vary. For example, instead of actuators that can rotate the rigid chain 130 around a vertical axis, the robotics system may include linear actuators that move gantries in multiple dimensions. As another example, a robotic arm can include a number of linkages that can rotate around an axis defined by the orientation of the corresponding linkage. By rotating a combination of the linkages, the position of the end effector of the robotic arm can move in three dimensions. It will be appreciated that other types of robotic systems that can be controlled to insert a plug into a charging port are within the scope of the present disclosure.

Figure 2:
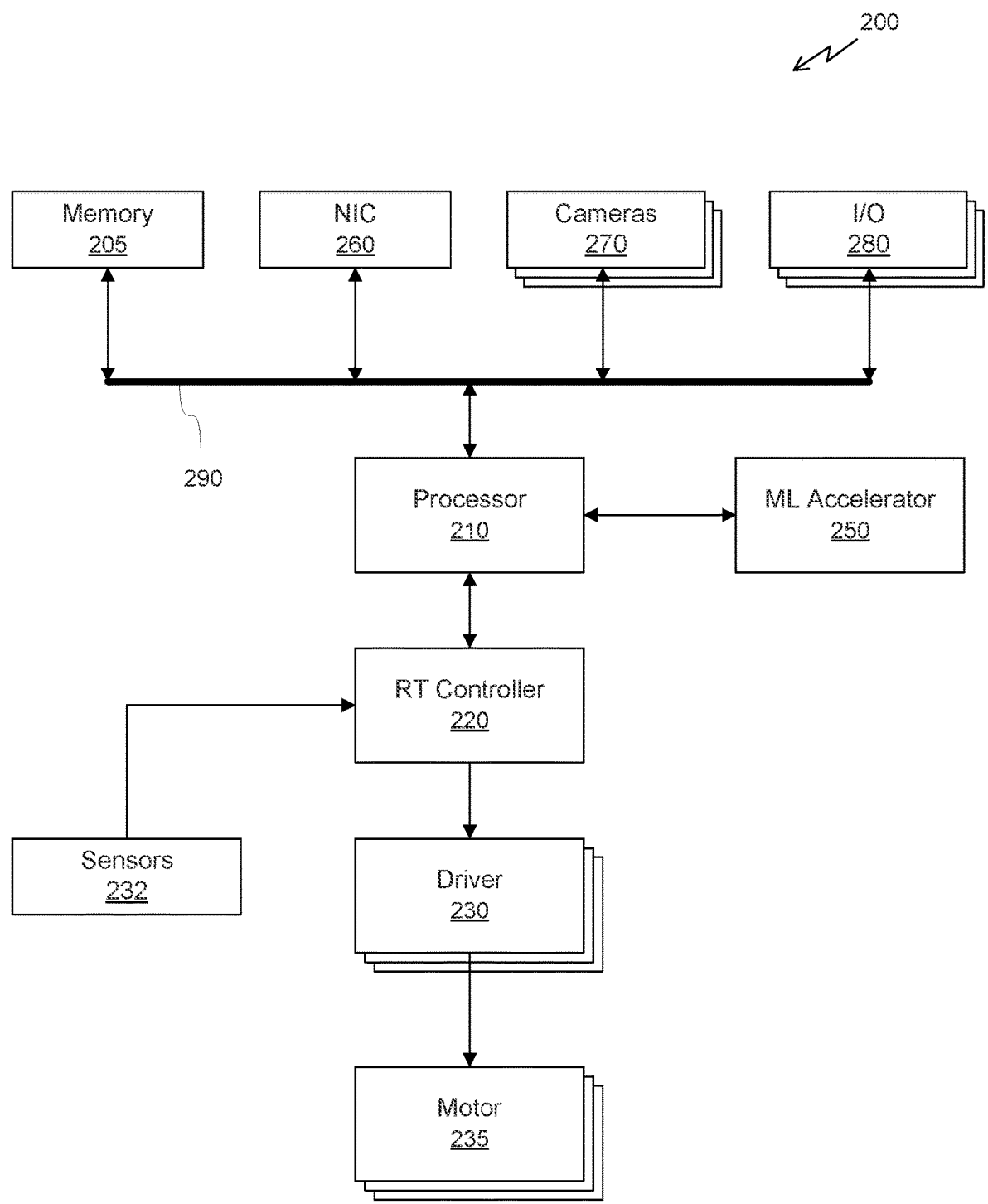
FIG. 2 is a schematic diagram of the automated charging system, in accordance with some embodiments.

FIG. 2 is a schematic diagram of a control system 200 for the automated charging system 100 of FIG. 1, in accordance with some embodiments. The control system 200 is designed to drive the actuators that control the location of the plug 150 relative to the charging port of the electric vehicle. The control system 200 may include one or more microcontrollers, processors (e.g., CPU, GPU, DSP, SoCs, ARM cores, etc.), programmable logic controllers, and the like configured to execute instructions and generate signals. The instructions can be stored in a non-transitory computer readable medium such as a non-volatile memory (e.g., HDD, SSD, Flash memory, or the like). The control system 200 can include interfaces for inputs and outputs (I/O) for receiving signals from one or more sensors and transmitting signals to one or more actuators or other external components. While the control system 200 shown in FIG. 2 is an exemplary control system for carrying out the techniques described herein, it will be appreciated that any control system including components in addition to or in lieu of those shown in FIG. 2 are within the scope of the disclosure.

As depicted in FIG. 2, the control system 200 includes a processor 210 connected to a real-time controller (RTC) 220. The processor may be a central processing unit (CPU) such as an Intel x86 CPU or may be an embedded microcontroller that includes a reduced instruction set computer (RISC) core. The processor 210 can be multi-threaded and include one or more cores that enable the processor 210 to execute different processes in parallel. In an embodiment, the processor 210 is connected to a memory 205 via a system bus 290. The memory 205 is may be a volatile memory such as a dynamic random access memory (DRAM). In an embodiment, the processor 210 and the memory 205 are included in a single package referred to as a package-on-package (POP) or in a system-on-a-chip (SoC). In other embodiments, the processor 210 and the memory 205 are included in separate packages and connected via interconnects formed on a printed circuit board (PCB).

Conventional processors are typically not programmed to execute programs in real-time. In some cases, an operating system will stall a program for significant time (tens or even hundreds of milliseconds) while background processes are performed by the operating system. Furthermore, where a program relies on data stored in an external memory, such as memory 205, delays in loading the data may cause a program to stall, especially where the memory 205 can be accessed by several different components. The RTC 220 is a device that operates in accordance with stricter time constraints. For example, the RTC 220 may only allow for one or two processes to run in parallel, and each process is guaranteed a certain amount of execution time during each processing period (e.g., 1 ms). By simplifying the programs that are designed to run on the RTC 220, and potentially limiting the types of instructions that can be executed by the RTC 220, the expected functions controlled by the RTC 220 can be expected to executed at a particular frequency.

In practice, the RTC 220 is used to drive the actuators for controlling the position of the plug 150, while the processor 210 is used to instruct the RTC 220 a target position of the plug 150. The RTC 220 may generate signals for each of the one or more actuators. In this case, each actuator corresponds to a motor driver 230 connected to a motor 235. The motor driver 230 includes electrical components that isolate the control signal (i.e., a low current signal of low voltage) from the load current (i.e., higher current and higher voltage) for the motors 235. The Motors 235 can be AC or DC motors and/or stepper motors. In some embodiments, the actuators can include other types of devices including pneumatic or hydraulic cylinders, linear actuators, or the like.

In some embodiments, the RTC 220 receives signals from sensors 232 that are used in feedback of a closed-loop system. For example, the sensors 232 can include optical encoders (e.g., quadrature encoders) that indicate a position of a corresponding motor axis. The RTC 220 can implement a proportional-integral-derivative (PID) control algorithm to generate a signal that is proportional to the error between the position indicated by the feedback signal and the target position received from the processor 210. In other embodiments, the RTC 220 can implement an open-loop system, such as by outputting a signal for a stepper motor that assumes the motor advances in accordance with the signal without any feedback from an encoder. Such embodiments may be cheaper to implement but can be unreliable when unexpected things happen, such as encountering an obstruction that causes the stepper motor to miss steps.

The processor 210 can also be connected to additional components via the system bus 290. For example, the control system 200 can include a network interface controller (NIC) 260, one or more cameras 270, and additional sensors 280. The NIC 260 can implement a wired or wireless interface, such as wired Ethernet or IEEE 802.11 wireless interfaces. The NIC 260 can allow the automated charging system 100 to communicate over a network (e.g., a local area network) or via an ad hoc point-to-point connection. For example, the NIC 260 may enable the automated charging system 100 to communicate with a terminal device such as a user's phone to transmit signals indicating a state of charge of the electric vehicle during charging.

The camera(s) 270 can be used to capture images of the charging bay in order to provide feedback that can be used by the processor 210. For example, a camera 270 mounted on the chassis 120 can be used to take an image of the charging bay in order to detect the presence of an electric vehicle. In some embodiments, the camera 270 can be configured to capture an image periodically (e.g., every 30 seconds) to determine whether a vehicle has entered the charging bay. In some cases, the image can be analyzed to determine a classification of the vehicle and/or a position and orientation of the vehicle. As another example, a camera 270 mounted on or proximate to the plug 150 can be used to capture an image directly in front of the plug 150. Such images can be used to determine a location of a charging port on the electric vehicle. These images can also be used to estimate a relative position between the plug 150 and the charging port in order to change a target location for the plug 150 to effectuate insertion of the plug 150 into the charging port, as will be discussed in more detail below.

The additional sensors 280 can include, but are not limited to, limit switches, current sensors, Hall effect sensors, and the like. These additional sensors can, among other functions, detect a home position of one or more axes, detect whether the electric vehicle is being charged properly, or provide other types of feedback that may be used by the processor 210.

In some embodiments, the processes implemented by the processor 210 can incorporate various artificial intelligence (AI) functionality. For example, images captured by the cameras 270 can be analyzed using neural networks such as a convolutional neural network (CNN), a recurrent neural network (RNN), or the like. In one embodiment, an image of the charging bay can be analyzed by a neural network configured to detect a type of electric vehicle in the charging bay. The neural network can be referred to as a classifier and returns an output of the neural network that indicates whether the electric vehicle is one of a plurality of different models. For example, the neural network may be capable of determining whether the electric vehicle is a Tesla™ model S or a Nissan™ Leaf.

In some embodiments, the processor 210 is configured to analyze the image by implementing the neural network. For example, in the case of a CNN, the processor 210 can be configured to apply a filter kernel (e.g., a convolution filter) to a set of activations based on the image. The outputs of the filter kernel define a new set of activations. Each layer of the neural network can implement a separate filter kernel that is designed to filter the activations from a previous layer, and the structure of the CNN can have multiple layers. The CNN can also include pooling layers and fully-connected layers that are configured, via various parameters, to generate the output of the CNN, which can be a vector having values that indicate the confidence that the image includes a vehicle of a particular type.

Various image processing algorithms that utilize neural networks are well-known to those of skill in the art. In some embodiments, the control system 200 includes a machine learning (ML) accelerator 250 that is coupled to the processor 210. In an embodiment, the ML accelerator 250 is a parallel processing unit such as a graphics processing unit (GPU), vector processing unit (VPU), tensor processing unit (TPU), or the like. The ML accelerator 250 may be better suited to execute a large number of similar operations on different data in parallel, thereby speeding up the execution of the ML algorithm compared to executing said algorithm on the processor 210. Thus, the processor 210 may direct the ML accelerator 250 to process an image by a ML algorithm such as a CNN. The ML accelerator 250 may then transmit a result of the ML algorithm back to the processor 210 for further processing. The processor 210 may then use the output of the classifier network to, e.g., determine an expected location of the charging port on that particular electric vehicle. The expected location may then be used to position the plug 150 in an area that is expected to be close to the charging port in order to insert the plug 150 into the charging port via additional feedback from other sensors 232/cameras 270.

Although the ML accelerator 250 may be described in terms of implementing a neural network, in other embodiments, the ML accelerator 250 can implement any ML algorithm or conventional algorithm (e.g., image processing algorithm) that is technically feasible and that can be offloaded from the processor 210 to the ML accelerator 250.

Figure 3:
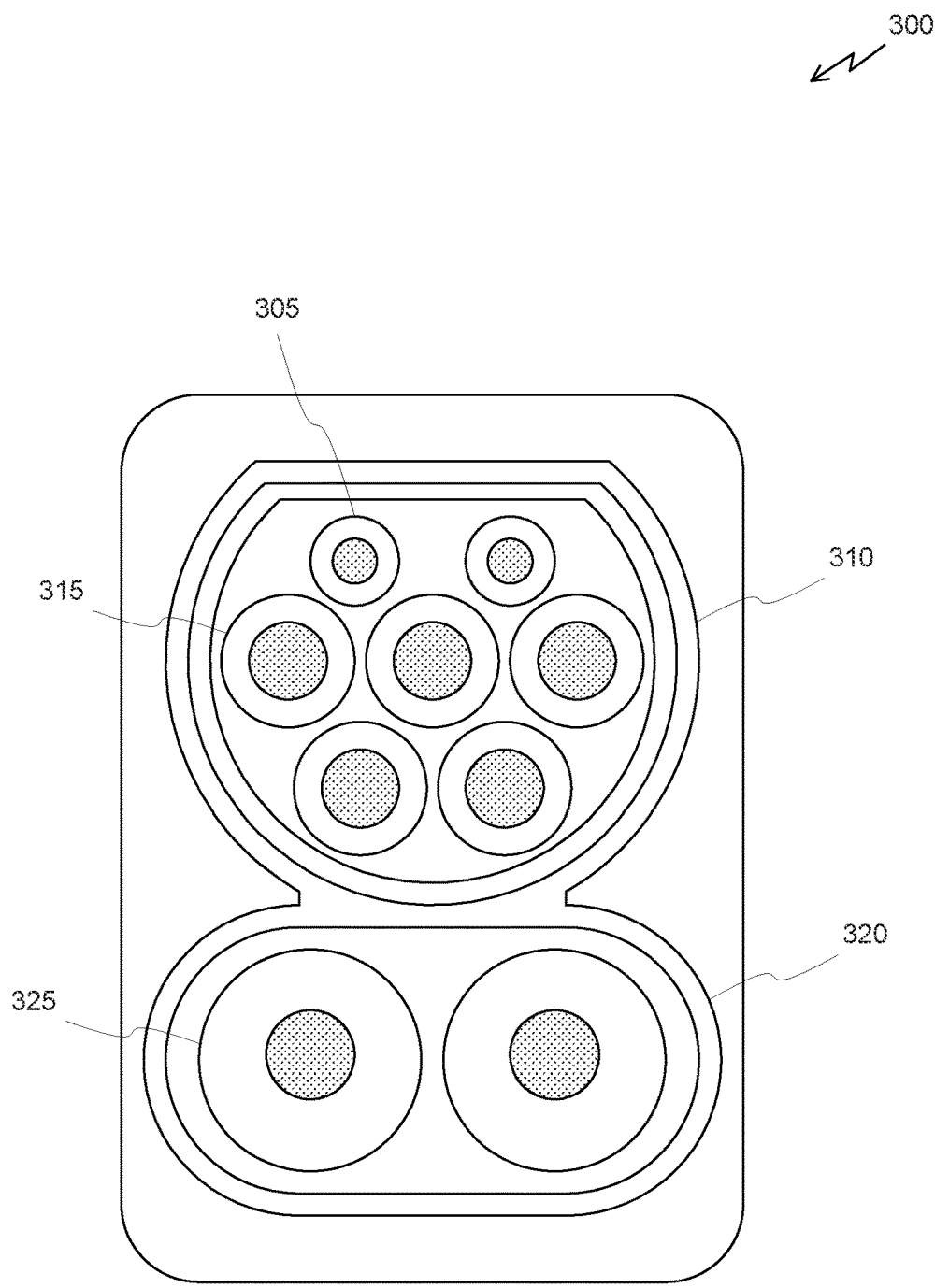
FIG. 3 illustrates a charging port of an electric vehicle, in accordance with an embodiment.

FIG. 3 illustrates a charging port 300 of an electric vehicle, in accordance with an embodiment. The charging port 300 may be referred to as a combined charging system (CCS) socket and is designed to mate with a corresponding plug. The charging port 300 may include a socket that complies with a Society of Automotive Engineers (SAE) J1772 standard for AC charging as well as provide additional sockets for fast DC charging.

As shown in FIG. 3, the charging port 300 includes two distinct charging receptacles, a first receptacle 310 for use with AC charging and a second receptacle 320 for use with DC charging. The electric vehicle's charging system may be designed to charge the storage system (e.g., batteries) of the electric vehicle using either AC or DC power. The standard pinout provides two pins 305 that provide proximity pilot (i.e., pre-insertion signaling) and control pilot (i.e., post-insertion signaling) for indicating when the plug is nearly inserted or fully inserted, respectively. The five AC pins 315 include three-phase AC line inputs plus AC neutral and earth ground signals for connecting a three-phase AC power source. If single phase power is used, then only one of the line inputs may be connected. The two DC pins 325 include a line and neutral pin for connecting a DC power source.

It will be appreciated that the charging port 300, while standard in North America, may not be used in other regions of the world, may be superseded by a new socket design, or may be replaced by a proprietary socket by particular manufacturers. However, the techniques disclosed below may be applied to other types of charging ports sharing characteristics that are similar to the charging port 300, such as both AC and DC charging pins and/or a negative space surrounding the conductive pins.

Figure 4A:
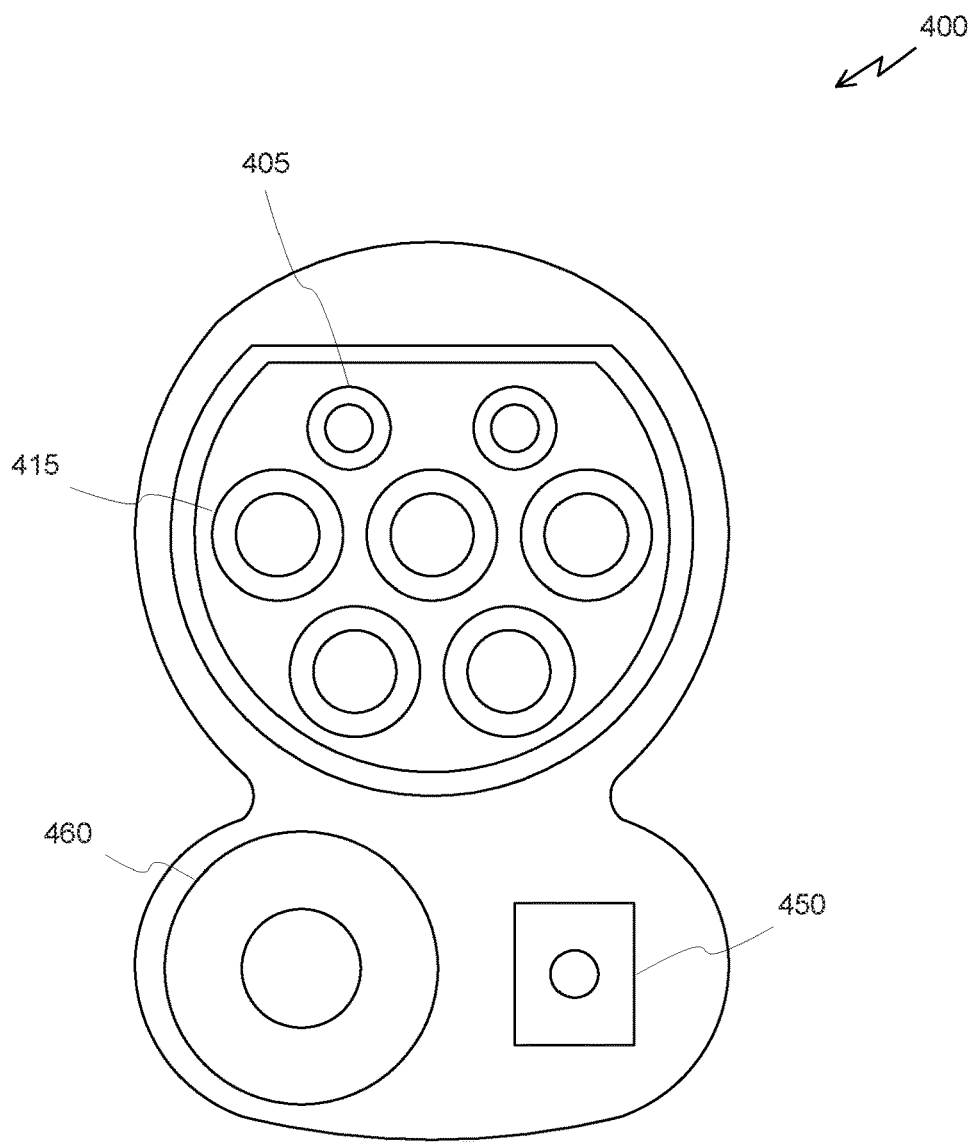
FIGS. 4A-4B illustrates a plug configured to be inserted into the charging port, in accordance with one embodiment.
Figure 4B:
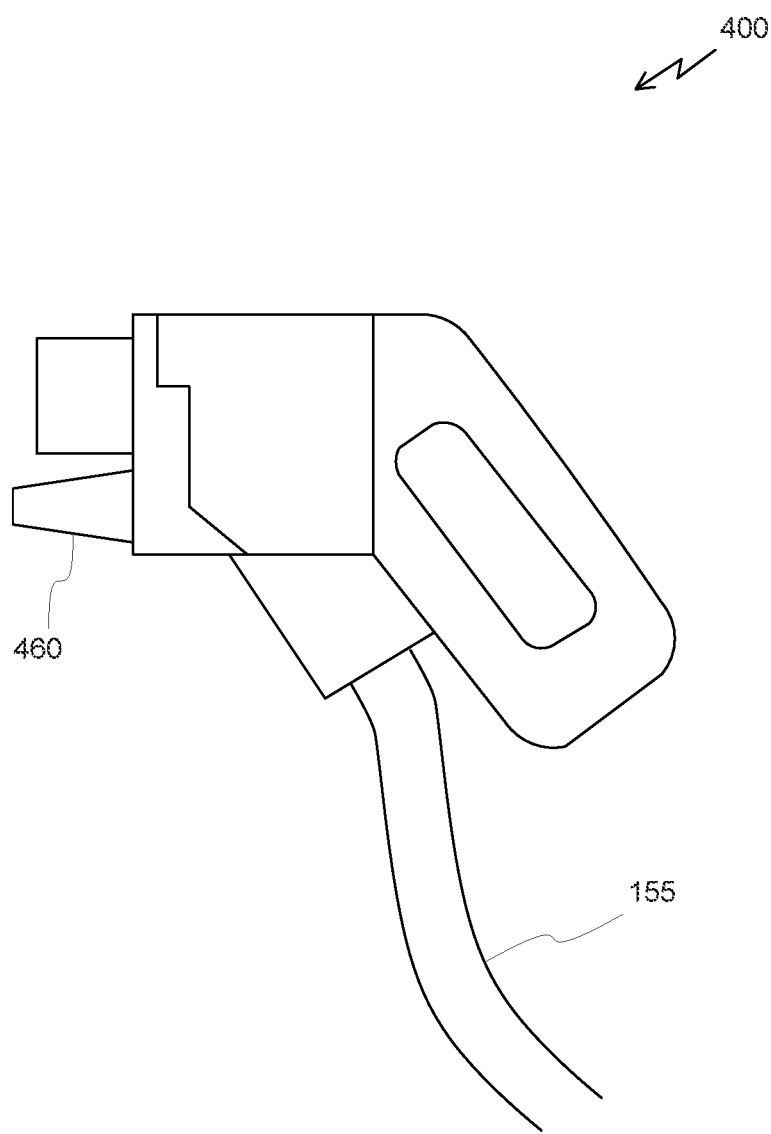

FIGS. 4A-4B illustrate a plug 400 configured to be inserted into the charging port, in accordance with some embodiments. The plug 400 can replace plug 150 in the automated charging system 100. As depicted in FIG. 4A, the plug 400 includes two sockets 405 for the proximity pilot and the control pilot pins 305 of the charging port 300. The plug 400 also includes five AC sockets 415 that correspond to the three-phase AC line inputs, AC neutral, and earth ground signals. The plug 400 does not include corresponding sockets for the DC pins 325, as the plug 400 is configured to only Level 1 or Level 2 AC charging capabilities.

In an embodiment, instead of including DC sockets, the plug 400 includes a camera assembly 450 and a tapered structure 460. The camera assembly 450 can include an image sensor (e.g., CMOS image sensors, CCD image sensor, etc.), a lens, filters, and the like. In some embodiments, the camera assembly 450 includes movable components that enable optical zoom or focus adjust capability. In other embodiments, the focus of the camera assembly 450 is fixed. The camera assembly 450 is configured to capture images of the environment in front of the plug 400.

In an embodiment, the camera assembly 450 also includes an infrared (IR) light source (not explicitly shown) that allows the charging bay and/or electric vehicle to be illuminated with IR light rather than relying on ambient light for illumination. The camera assembly 450 may include an IR filter such that the image sensor captures reflected light from the IR light source. Relying on images from the IR light source may alleviate issues from reflections of sunlight or other issues due to varying lighting conditions.

In some embodiments, the plug 400 may include two offset camera assemblies. The two camera assemblies can capture a stereoscopic image (i.e., a left and a right image). In an embodiment, a disparity between objects (in pixels or sub-pixel units) can be calculated for each pixel of the left or right image with a corresponding pixel for that object in the other image. The disparity can be used to estimate a distance to the object, with large disparities correlating with smaller distances. In some embodiments, a neural network can be trained to process the image to estimate the disparity value for each pixel of one of the left or right images. The processor 210 can then estimate the relative distance to an object based on the disparity values. However, it will be appreciated that multiple camera assemblies may increase the overall cost of the system, which might be undesirable where reducing costs is an important aspect of the system. Thus, other embodiments, may process monocular images based on other object recognition algorithms or neural network models.

In an embodiment, the tapered structure 460 is designed to interface with a corresponding DC pin 325. The tapered structure 460 may be made of a dielectric material that electrically isolates the plug from the DC pin 325. The tapered structure 460 is shown in side profile view in FIG. 4B, and a tip of the tapered structure 460 may extend beyond a front surface of the sockets 405/415. The tapered structure 460 is designed to fit over the pin and contact a cylindrical surface that surrounds the DC pin 325. The outer surface of the tapered structure 460 is tapered such that a radius of the tip of the tapered structure 460 is smaller than the radius of the cylindrical surface surrounding the DC pin 325. A radius of the base of the tapered structure 460 is the same radius of the cylindrical surface or slightly larger than the radius of the cylindrical surface such that, when the plug is fully inserted into the charging port 300, the radius of the tapered surface at a contact point on the edge of the cylindrical surface that surrounds the DC pin 325 is equal or slightly smaller to the radius of the cylindrical surface. Of course, in some embodiments, the radius of the base of the tapered structure may be smaller than the radius of the cylindrical surface. However, in such cases, the ability to locate the plug will be less accurate, and the accuracy may be related to the difference in radii between the base of the tapered structure and the cylindrical surface.

The tapered structure 460 is designed to allow for less accurate positioning of the plug by the robotics system such that a mechanical interference between the tapered surface and the DC pin 325 will effect fine adjustments in position and/or orientation of the plug 400. It will be recognized that not all charging ports include both the AC connections and the DC connections. Some charging ports may not include the DC fast charging pins. In an embodiment, the tapered structure 460 may be spring loaded and capable of retracting into the body of the plug 400. The spring applies a pressure against the tapered structure 460 to extend the tapered structure from the body. Upon contact with an object, such as a surface where the DC pins would normally be located, the force of the spring may be overcome by the force of the actuators moving the plug forward, thus pushing the tapered structure 460 into the body of the plug. Thus, if the tapered structure 460 hits a surface other than the intended cylindrical surface surrounding the DC pin 325, then the tapered structure 460 will be pushed back into the body of the plug 400, allowing the plug 400 to be fully inserted into a corresponding AC charging port.

In operation, the camera assembly 450 captures images of the charging port 300 on an electric vehicle. The control system 200 can analyze the images to register a position and/or orientation of the plug 400 relative to the charging port 300. For example, in an embodiment, the ML accelerator 250 may process the image to estimate a distance from the camera assembly 450 to each of the two DC pins 325 of the charging port 300. The processor 210 then takes the output of the ML accelerator 250 and calculates different setpoints for the one or more actuators to move the plug 400 into position to insert the plug 400 into charging port 300. In some embodiments, the processor may follow a path that moves the plug 400 from a home position proximate the chassis 120 through a number of waypoints between the home position and the charging port 300. For example, a first image can be captured that determines approximately where the charging port 300 is located based on where the electric vehicle is parked relative to the chassis 120. This image can be captured by the camera assembly 450 or a separate camera located on the chassis 120 or in any other location. The control system 200 then positions the plug in front of the charging port 300 but at a distance sufficient to where fine adjustments can be made during the actual insertion of the plug 400. Additional waypoints may then be set between this initial position and the final insertion position, with a new image captured periodically to adjust the signals to the actuators to make fine adjustments as the plug 400 is moved. Again, in order to decrease a cost and complexity of the automated charging system 100, the actuators may rely on the closed-loop feedback from the camera assembly 450 and/or the mechanical assistance from the tapered structure 460 such that accurate open-loop positioning based only on the robotics system is not crucial for effective mating of the plug 400 and the charging port 300.

As shown in FIG. 4A, the camera assembly 450 is positioned such that the camera captures images of at least one DC pin 325 all the way through insertion. This allows the camera assembly 450 to capture images that can be used for closed-loop feedback during the entire insertion procedure rather than relying on open-loop control during a final portion of the insertion procedure because the view of the camera is blocked by the sockets being inserted into the charging port 300.

Figure 5:
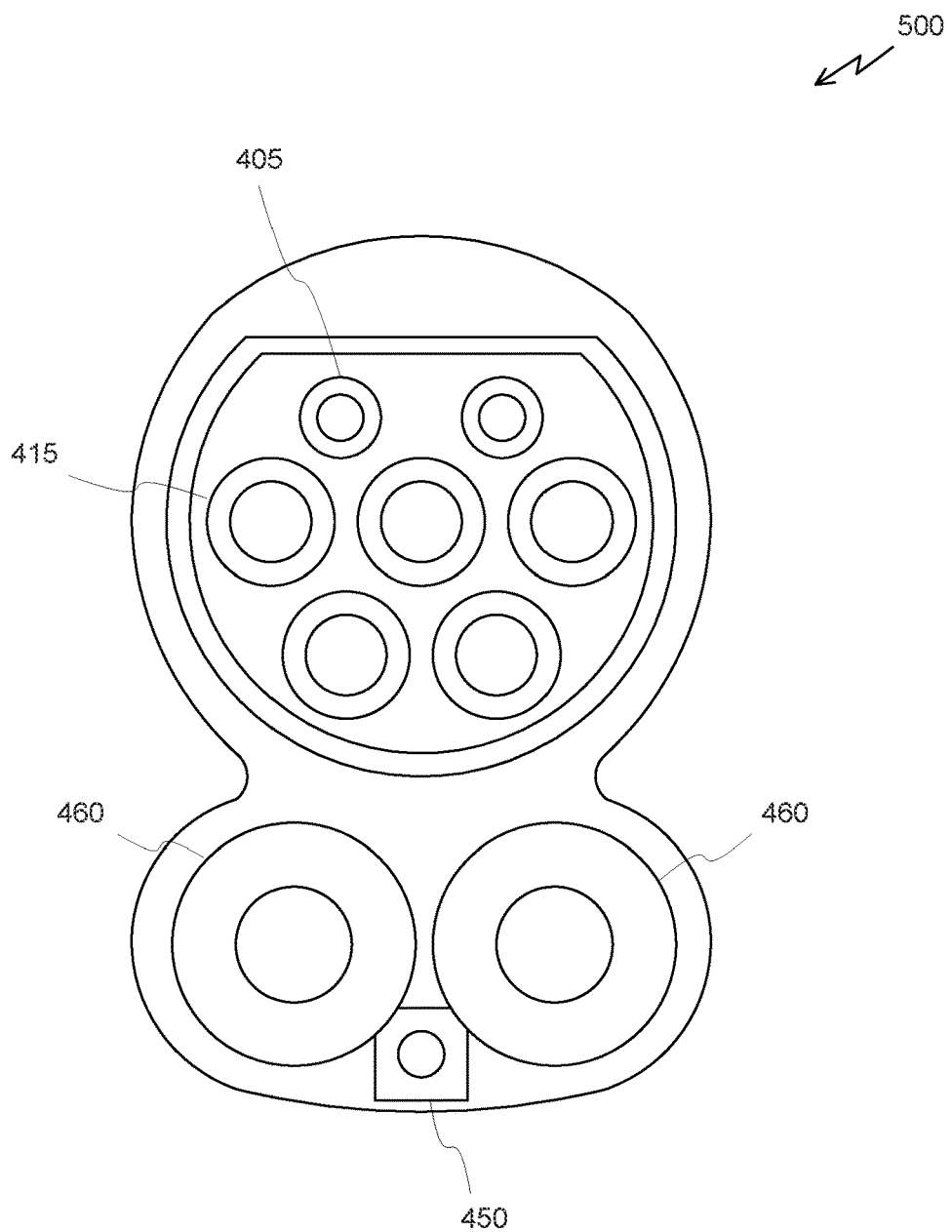
FIG. 5 illustrates a plug configured to be inserted into the charging port, in accordance with another embodiment.

FIG. 5 illustrates a plug 500 configured to be inserted into the charging port, in accordance with another embodiment. As depicted in FIG. 5, in another embodiment, the plug 500 includes a pair of tapered structures 460 that are designed to mate with the two DC pins 325. The camera assembly 450 is then relocated between the tapered structures 460. Having two tapered structures 460 can promote alignment and rotation of the plug 500. It will be appreciated that the tapered structures 460 may block the view of the DC pins from the camera assembly 450 during a final portion of the motion. As such, in some embodiments, a surface of the charging port 300 can include a marking or other structure at a location that is visible to the camera assembly 450 during this final portion of the motion and the processor 210 can be configured to key off this location for closed-loop feedback during this last step of the procedure. For example, IR reflective crosshairs can be painted or adhered to the charging port that can be measured, i.e., by counting a number of pixels for the length of each side of the crosshairs, to estimate a distance until the insertion is complete.

Although the plugs 400 and 500 have been described as including the AC sockets 415 and placing the camera assembly 450 and tapered structure(s) 460 at a location corresponding to the DC pins of the charging port 300, in other embodiments, the plug can be designed for fast DC charging by including corresponding DC sockets and omitting the AC sockets 415. The camera assembly 450 and tapered structure(s) 460 would then be located above the DC sockets and register a location based off images and the estimated location(s) of the AC pins 305 included in the charging port 300. In yet other embodiments, a plug can be designed that includes both the AC sockets and DC sockets, where the camera assembly 450 and tapered structure(s) 460 are relocated to a different location on the plug body and configured to interact with additional surfaces or structures of a proprietary charging port that is modified from the charging port 300 shown in FIG. 3. For example, the charging port 300 can be modified to include a separate hole (not including a corresponding pin) for the tapered structure 460 and the camera can be positioned to capture images of a separate structure or marking proximate the AC pins 315 or DC pins 325.

Figure 6:
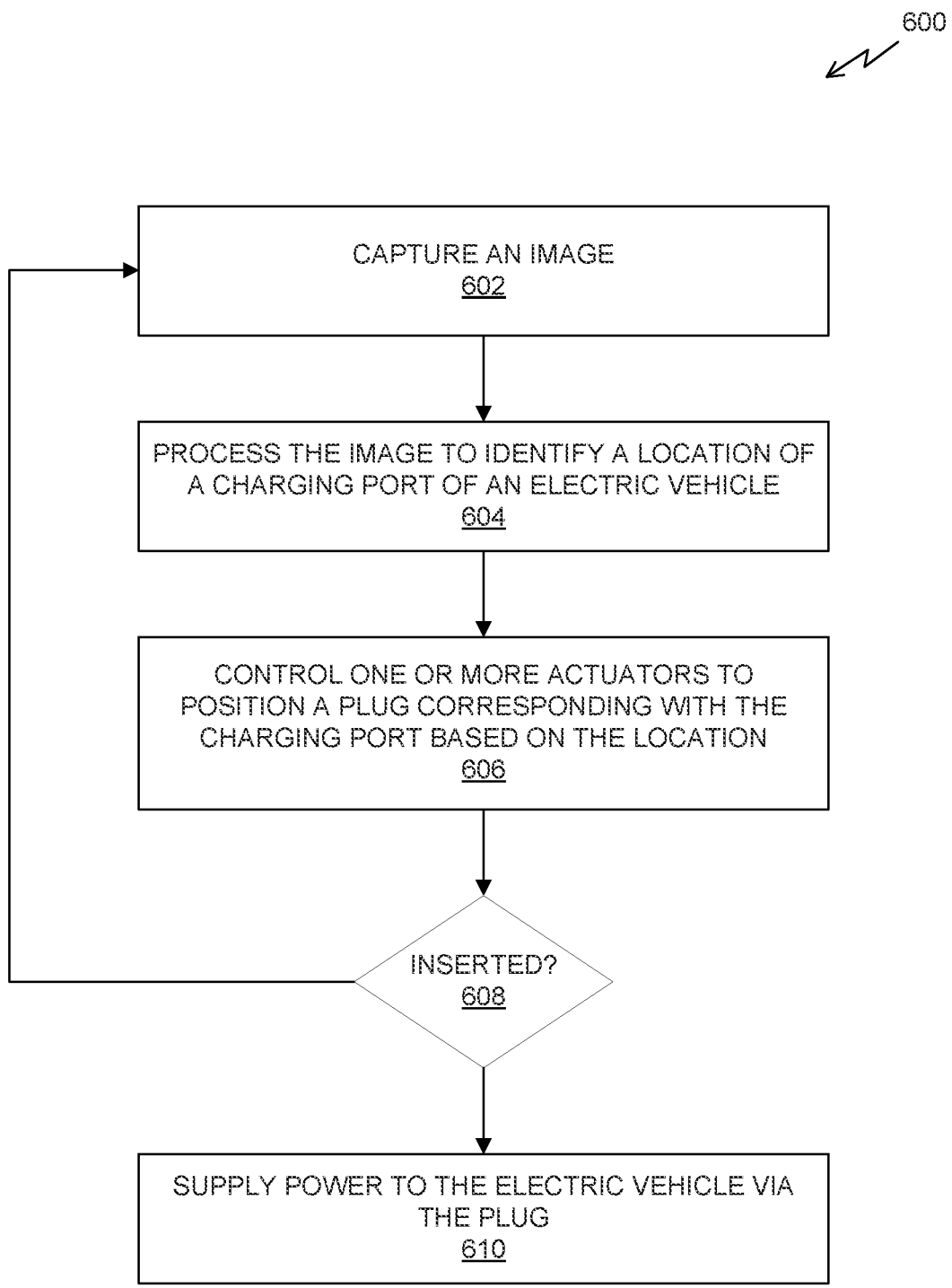
FIG. 6 is a flow diagram of a method for inserting the plug into the charging port of an electric vehicle, in accordance with some embodiments.

FIG. 6 is a flow diagram of a method 600 for inserting the plug into the charging port of an electric vehicle, in accordance with some embodiments. The method 600 can be performed by the automated charging system 100. In some embodiments, the steps detailed below can be implemented by one or more of the processor 210, the RTC 220, and/or the ML accelerator 250. In an embodiment, the memory 205 stores instructions that, when executed by one or more of the processor 210, the RTC 220, and/or the ML accelerator 250, causes the automated charging system 100 to implement one or more steps detailed below.

At step 602, an image is captured. In an embodiment, the camera assembly 450 captures an image using an image sensor. The image may be transmitted to a processor 210 for analysis. In one embodiment, the plug 400 includes a wired interface that is connected to the processor 210 via a system bus 290, and the camera assembly 450 is included in the control system 200 as camera 270. In another embodiment, the plug 400 includes a wireless chip and transceiver, and the camera assembly 450 is configured to transmit the image wirelessly to processor 210 via NIC 260. For example, the control system 200 can establish an access point for a wireless LAN, and the plug can be configured to connect to the access point to transmit the image to the processor 210. The image can be stored in memory 205 and then read from the memory 205 by the processor 210.

At step 604, the image is processed to identify a location of a charging port of an electric vehicle. In an embodiment, the processor applies one or more algorithms to process the image. In an embodiment, an object recognition algorithm is applied to the image to identify the type or model of electric vehicle in the charging bay that is visible in the image. Once the type or model of electric vehicle is identified, the processor 210 can look up information including a location and/or type of charging port for that electric vehicle. The processor 210 can then estimate an approximate location of the charging port based on the location of the electric vehicle. Alternatively, the processor 210 can perform a refined search of the image to locate the charging port on the electric vehicle. In an embodiment, different electric vehicles may include different types of charging ports, and the processor 210 can be configured to apply different algorithms to the image based on the type of charging port associated with the electric vehicle.

For example, the processor 210 can be configured to process the image using a CNN executed by the ML accelerator 250. However, the parameters of the CNN (e.g., weights and biases associated with each of a plurality of layers of the CNN) can be different for different trained versions of the CNN, where each trained version of the CNN is trained using training data associated with a particular type of charging port. These different CNNs can then be applied to the image to increase the accuracy of the inference process.

It will be appreciated that the processing in step 604 may include any number of steps or algorithms, executed sequentially or in parallel on one or more processors, in order to generate the estimated location of the charging port on the electric vehicle. Conventional and ML-based algorithms may be executed during step 604, either alone or in combination.

At step 606, one or more actuators are controlled to position a plug based on the location. The plug may correspond to the charging port and include at least one connection for providing power to the electric vehicle. In an embodiment, the plug 400/500 is controlled in position and/or orientation relative to the charging port by at least three actuators. In some embodiments, four or more actuators are controlled to position the plug at a location in space and rotate the plug around one or more axes at the end of an effector arm. In some embodiments, the effector arm comprises a rigid chain that includes a plurality of links, wherein the cable can be extended or retracted from a chassis to increase or decrease a distance of the plug, radially, from the chassis.

At step 608, insertion of the plug is monitored. In an embodiment, the processor 210 monitors one or more signals corresponding to the plug to determine whether the plug is fully inserted. The signals can include the proximity pilot and/or the control pilot signal from a standard J plug interface implemented by the plug. In another embodiment, the processor 210 can be configured to process an image captured by the camera assembly 450 in order to determine whether the plug is fully inserted into the charging port. It will be appreciated that the size of the features of the charging port in the image will change as the distance between the plug and the charging port decreases. Thus, the size of such features can be used to determine whether the plug is fully seated in the charging port.

If, at step 608, the plug is not fully inserted into the charging port, then the method 600 returns to step 602 and repeats steps 602-608 to reposition the plug. However, if the plug is fully inserted, then the method proceeds to step 610 where power is supplied to the electric vehicle via the plug. In an embodiment, the processor 210 causes the power supply 110 to connect an AC power source to the plug via a relay or other electrical component. By only activating the plug once the plug is fully inserted, a chance of accidental electrocution can be reduced.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. An automated charging system for an electric vehicle, the automated charging system comprising:
   a plug configured to be mated with a charging port of the electric vehicle;
   a camera assembly mounted on the plug;
   one or more actuators configured to adjust a position of the plug relative to the charging port;
   a control system including one or more processors that are configured to control the one or more actuators based on an image of the charging port captured by the camera assembly; and
   a tapered structure attached to or integrated with the plug that contacts at least one surface of the charging port during insertion of the plug to force the plug to move relative to the charging port,
   wherein the tapered structure is attached or integrated with the plug at a first end, and a perimeter at a second end is smaller than a perimeter closer to the first end.

2. The automated charging system of claim 1, wherein the control system processes the image using an object recognition algorithm to identify at least one unused structure of the charging port that is unobstructed during insertion of the plug.

3. The automated charging system of claim 2, wherein the at least one unused structure of the charging port includes at least one direct current (DC) pin of the charging port, and wherein the plug is configured to be connected to at least two alternating current charging pins of the charging port when inserted into the charging port.

4. The automated charging system of claim 1, wherein the at least one surface of the charging port includes a cylindrical surface surrounding a DC pin of the charging port.

5. The automated charging system of claim 1, wherein the tapered structure is capable of being retracted into a body of the plug, and a force is applied to the tapered structure by a spring to extend the tapered structure from the body.

6. The automated charging system of claim 1, wherein the plug is mounted on a distal end of a rigid chain comprising a plurality of links, and the rigid chain can be extended from a chassis of the automated charging system.

7. The automated charging system of claim 6, wherein the one or more actuators include at least one actuator configured to rotate the plug around an axis defined according to the distal end of the rigid chain.

8. The automated charging system of claim 1, wherein the charging port comprises a combined charging system (CCS) connector that includes pins for AC charging as well as pins for DC charging.

9. The automated charging system of claim 8, wherein the plug includes corresponding sockets for AC charging that are designed to mate with the pins for AC charging, and wherein the plug does not include corresponding sockets for DC charging.

10. The automated charging system of claim 1, wherein the control system comprises:
- a memory configured to store the image;
- a processor configured to control the one or more actuators; and
- a machine learning (ML) accelerator configured to apply the image to a neural network to generate an estimate of a location of the charging port relative to the plug.

11. The automated charging system of claim 10, wherein the control system further comprises a real-time controller configured to generate signals for each of the one or more actuators.

12. The automated charging system of claim 1, wherein the plug includes a wireless chip and a transceiver configured to transmit the image to the control system via a wireless local area network.

13. A method for charging an electric vehicle, the method comprising:
- capturing, by a camera mounted on a plug, a first image of a charging port of the electric vehicle;
- processing the image to identify a location of the charging port relative to the plug;
- controlling one or more actuators to position the plug proximate the charging port based on the image;
- contacting at least one surface of the charging port with a tapered structure attached to or integrated with the plug during insertion of the plug;
- moving the plug relative to the charging port based on a geometry of the tapered structure, wherein the geometry of the tapered structure comprises a perimeter at a point of contact with the at least one surface of the charging port that is smaller than a perimeter closer to a point of attachment or integration with the plug; and
- supplying power to the electric vehicle via the plug.

14. The method of claim 13, the method further comprising:
- periodically capturing, by the camera, one or more additional images of the charging port;
- processing the one or more additional images to update the location of the charging port relative to the plug,
- wherein the position of the plug corresponding to the first image is different from a position of the plug corresponding to at least one image of the one or more additional images.

15. The method of claim 13, wherein the image is processed by a neural network to estimate the location of the charging port.

16. The method of claim 15, wherein the neural network comprises a convolutional neural network.

17. The method of claim 13, wherein controlling the one or more actuators further comprises:
- prior to insertion of the plug into the charging port, positioning the plug proximate the charging port based on the image; and
- inserting the plug into the charging port based on the geometry of the tapered structure.

18. An automated charging system, comprising:
- a power supply configured to generate an alternating current (AC) power for charging an electric vehicle;
- a plug connected to the power supply via a cable, wherein the plug includes a camera assembly configured to capture an image;
- a control system configured to process the image to estimate a location of a charging port of an electric vehicle, wherein the control system generates signals for one or more actuators that cause the automated charging system to position the plug relative to the charging port responsive to the location; and
- a tapered structure attached to or integrated with the plug that contacts at least one surface of the charging port during insertion of the plug, forcing the plug to move relative to the charging port,
- wherein the tapered structure is attached or integrated with the plug at a first end, and a perimeter at a second end is smaller than a perimeter closer to the first end.

19. The system of claim 18, wherein the control system comprises:
- a memory; and
- at least one processor configured to read the image from the memory and process the image via a neural network to estimate the location.

20. The system of claim 19, wherein the at least one processor includes a central processing unit and a machine learning (ML) accelerator, and wherein the ML accelerator implements the neural network to process the image.

* * * * *